United States Patent [19]

McGrath et al.

[11] 4,248,748
[45] Feb. 3, 1981

[54] HEAT-ACTIVATED ADHESIVE

[75] Inventors: Joseph M. McGrath, Maplewood; Daryl D. Johnson, Woodbury, both of Minn.

[73] Assignee: Minnesota Mining and Manufacturing Company, Saint Paul, Minn.

[21] Appl. No.: 118,230

[22] Filed: Feb. 4, 1980

[51] Int. Cl.³ .............................................. C08L 93/04
[52] U.S. Cl. .................................. 260/27 R; 106/236; 204/159.12; 260/25; 428/412; 428/463; 428/483; 428/497
[58] Field of Search ................ 260/27 R, 25; 106/236

[56] References Cited

U.S. PATENT DOCUMENTS

| Re. 24,906 | 12/1960 | Ulrich | 206/509 |
|---|---|---|---|
| 3,485,783 | 12/1969 | Kehe | 260/27 R |
| 3,615,106 | 10/1971 | Flanagan et al. | 260/27 R |
| 3,677,985 | 7/1972 | Sirota et al. | 260/27 R |
| 4,028,292 | 6/1977 | Korpm an | 260/27 R |
| 4,139,675 | 2/1979 | Nagai et al. | 428/349 |
| 4,144,208 | 3/1979 | Fuchs et al. | 260/27 R |
| 4,157,418 | 6/1979 | Heilumann | 428/355 |
| 4,167,433 | 9/1979 | Lakshmanan | 260/25 |
| 4,192,788 | 3/1980 | Dodson | 260/27 R |

FOREIGN PATENT DOCUMENTS 868965 4/1971 Canada ...................................... 260/27

OTHER PUBLICATIONS

Wetzal, Rubber Age, Nov. 1957, pp. 291–295.
Naturman (Editor) Polymer–Plastics Techn. & Engr. vol. 2 (Dekker, N.Y.), 1974, pp. 162, 174–177.

Primary Examiner—H. S. Cockeram
Attorney, Agent, or Firm—Cruzan Alexander; Donald M. Sell; Roger R. Tamte

[57] ABSTRACT

Heat-activated adhesive comprising a pressure-sensitive-adhesive acrylate polymer and a tackifying resin, the latter being included in sufficient amount to lower the pressure-sensitive adhesion of the complete heat-activated adhesive to levels needed for convenient and effective room-temperature handling of sheets coated with the adhesive, while leaving the adhesive with the capacity for strong heat-activated bonds.

10 Claims, No Drawings

HEAT-ACTIVATED ADHESIVE

Although the heat-activated adhesives presently used on reflective sheeting are excellent for most purposes, they do have deficiencies in some important aspects, particularly in the adhesion they provide on certain enameled support panels and other substrates. Attempts to use other existing adhesives to obtain adhesion to a broader range of substrates have been hampered by the need for several other properties in the adhesive, including some room-temperature pressure-sensitive adhesiveness in addition to heat-activated adhesiveness. Room-temperature pressure-sensitive adhesion (commonly called preadhesion for heat-activated adhesives) is desired so that an assembly of reflective sheeting and support panel will adhere together and be handled conveniently and effectively prior to heat-activation of the adhesive. On the other hand, the preadhesion should be low enough to allow the reflective sheeting to be readily moved around and positioned on a support panel before the heat-activating operation. To our knowledge no existing heat-activated adhesive offers the range of properties needed for optimum use on reflective sheeting, including adhesion to the noted enameled support panels and other substrates and a desired range of room-temperature pressure-sensitive adhesiveness or preadhesion.

The present invention provides a new family of heat-activated adhesives that offer a range of properties especially useful for reflective sheeting as well as for other uses. In brief summary, these new heat-activated adhesives comprise (a) an acrylate polymer capable of room-temperature pressure-sensitive adhesion of at least 100 grams per centimeter width; and (b) room-temperature-solid tackifying resin added in sufficient amount that, although such a tackifying resin is normally used to increase room-temperature tackiness of polymers such as natural rubber, the presence of the tackifying resin in the heat-activated adhesive reduces room-temperature pressure-sensitive adhesiveness of the adhesive. This reduction in room-temperature pressure-sensitive adhesiveness of the adhesive to less than the pressure-sensitive adhesion of the acrylate polymer prior to addition of the tackifying resin brings preadhesion of the adhesive to a desired range. At the same time, when the adhesive is activated by heat, it is found to offer good adhesion to a wide range of substrates.

The ability of tackifying resins to increase the room-temperature tackiness of base polymers such as natural rubber is well known and has provided a basis for over 50 years for the formation of "rubber-resin" pressure-sensitive adhesives. Also, tackifying resins have been mixed with acrylate polmers, though typically not with acrylate polymers that exhibit pressure-sensitive properties themselves, without modification. In some cases the resulting blend is intended for use as a heat-activated adhesive; see Nagai et al, U.S. Pat. No. 4,139,675, which teaches a heat-activated adhesive that is used as an adhesive layer on an electrostatic recording paper, and that comprises a thermoplastic polymer such as a polyacrylate or polymethacrylate resin, and preferably a tackifying resin, which lowers the temperature at which the adhesive layer can be activated.

However, we are not aware of any occasions in this prior work when a tackifier was added to a pressure-sensitive-adhesive acrylate polymer in amounts sufficient to take away a principal part of the pressue-sensitive adhesion offered by the acrylate polymer. Such an addition would be considered counterproductive by conventional standards, since tackifying resins are intended to provide tackiness, not remove it. It has been recognized that there are optimum amounts of tackifying resin which produce maximum values of tackiness when mixed with a rubber, and that inclusion of greater than these optimum amounts results in a decline in tackiness from the maximum value of tackiness. See, for example, *Polymer-Plastics Technology and Engineering*, Volume 2, pp 161, 162 and 174-177 (Marcel Dekker, New York 1974). However, no advantage is suggested in such prior-art discussions for addition of "excessive" amounts of tackifier, nor is there a suggestion of modifying pressure-sensitive-adhesive acrylate polymers to produce tackiness less than the initial tackiness of the acrylate polymer.

We have now found, contrary to the prior-art perspective, that addition of room-temperature-solid tackifying resin to pressure-sensitive-adhesive acrylate polymer in amounts sufficient to reduce room-temperature tackiness produces a unique combination of properties, including tailored amounts of room-temperature preadhesion and good levels of heat-activated adhesion to a wide range of substrates. In some cases the strength of the heat-activated bond is greater than that of the pressure-sensitive adhesive bond that could be achieved by the acrylate polymer without modification.

As an illustration of the desirable properties that can be achieved with an adhesive of the invention, when sheeting carrying a 25-micrometer-thick layer of the adhesive is pressed against a variety of enameled panels, with the adhesive layer against the panels, and then exposed to a cycle of heating to a temperature above 75° C. and cooling to room-temperature, the sheeting will generally develop an adhesion to the panels of at least 350 grams/centimeter (2 pounds/inch) width, and with preferred adhesives, at least 700 grams/centimeter (4 pounds/inch) width. At the same time the adhesive exhibits a desired range of preadhesion for good handling characteristics; for example, preferred adhesives of the invention will generally exhibit between about 35 grams/centimeter and 350 grams/centimeter width preadhesion on an intended useful substrate. These values adapt the adhesive especially well to use as a heat-activated adhesive layer on reflective sheeting. Other values, which might be desirable for other uses, can be obtained by, for example, varying the amount of tackifying resin present.

DETAILED DESCRIPTION

Pressure-sensitive-adhesive acrylate polymers useful in the heat-activated adhesive of the invention are well known. Such acrylate polymers (i.e., polymers of which at least 50 percent of the monomeric ingredients are an ester of acrylic or methacrylic acid) can be adhered to typical surfaces with mere hand pressure. For purposes herein, pressure-sensitive adhesiveness is measured by pressing a 25-micrometer-thick polyethylene terephthalate film carrying a layer of the adhesive against a polycarbonate panel and measuring the force required to peel the film from the panel at an angle of 90°. Pressure-sensitive adhesives generally exhibit an adhesive force of at least 100 grams per centimeter width, and more typically at least 200 grams per centimeter, in this test.

One class of such pressure-sensitive-adhesive acrylate polymers well-suited to the present invention are copolymers as described in Ulrich, U.S. Pat. No. Re. 24,906. These copolymers include as a major monomeric ingredient an acrylic acid ester, generally of nontertiary alkyl alcohol, the molecules of which have from 1–14 carbon atoms; and at least one monomer copolymerizable with the acrylic acid ester. Illustrative useful acrylic acid ester monomers are isooctyl acrylate, methyl butyl acrylate, and 2-ethyl hexyl acrylate, and comonomers reactive with the acrylic acid ester are acrylic acid, methacrylic acid, itaconic acid, acrylamide and methacrylamide. Other acrylate pressure-sensitive adhesive polymers besides those listed in the Ulrich patent are useful in the invention, including, for example, polymers that include acrylonitrile, vinyl acetate, or styrene as monomeric ingredients in addition to the acrylic acid ester monomer. Other monomers useful as comonomers with the acrylic acid ester include acrylic-functional aminocarboxylic acids and derivatives such as taught in Heilmann, U.S. Pat. No. 4,157,418.

The acrylate polymers may be applied from solution or may be applied in liquid (i.e., sufficiently fluid that they may be coated or extruded), lower-molecular-weight forms and then reacted to higher-molecular-weight forms. Reaction can be obtained by irradiating the coated adhesive mixture, whereby hydrogen atoms are abstracted from points along the base acrylate polymer or resinous additives, leaving free radicals that become coupled together. The increased molecular weight obtained by the crosslinking changes the adhesive from a coatable liquid to a solid having the preadhesion and heat-activation characteristics stated above. The irradiation procedure avoids use of solvent, which can be a significant advantage.

Tackifying resins useful in the invention may be selected from well-known resins, which are generally thermoplastic, resinous, room-temperature solids characterized by their ability to increase the tackiness of natural rubber. Tackiness can be measured by a variety of tests, such as the "inclined trough" or "rolling ball" test in which a stainless steel ball is allowed to roll down an inclined trough on which a tape coated with the mixture being tested is supported. Tackifying resins useful in adhesives of the present invention will usually increase the tackiness of natural rubber in the stated test when added in typical amounts of 50 to 100 parts per 100 parts of natural rubber. Even if the tackifying resins do not tackify natural rubber, however, they still will be useful in the invention if they tackify the acrylate polymer used in the adhesive.

Naturally occurring materials, which are typically complex mixtures of high-molecular-weight organic acids and related neutral materials, are a common form of tackifying resin. Wood or other rosins, or modified forms of such naturally occurring rosins, e.g., hydrogenated or esterified rosins, are particularly useful. Polymers of terpene, pinene, etc., and low-molecular-weight styrene resins are also useful.

Although the tackifying resin used in an adhesive of the invention may increase the tackiness of the adhesive when added in lower amounts, as more and more tackifying resin is included, pressure-sensitive adhesion declines to a level less than that which the acrylate polymer in the adhesive would provide without any tackifying resin. For use on reflective sheeting, sufficient tackifying resin is generally included so that the pressure-sensitive adhesion of the mixture of tackifying resin and acrylate polymer is less than about 350 grams per centimeter width. The lower the amount of adhesion, as less than 100 or 200 grams/centimeter, the easier for users to handle and position sheeting coated with the adhesive, since the sheeting does not become adhered into place prematurely. Most often, in the absence of any other additives, 20 parts or more of tackifying resin are added per 100 parts of acrylate polymer to achieve the desired deadening of pressure-sensitive adhesion, and preferred results appear to be obtained when the tackifying resin is used in an amount equal to one-third or more of the amount of the acrylate polymer.

As previously indicated, a minimal amount of room-temperature pressure-sensitive adhesion or preadhesion is useful to keep reflective sheeting assembled against a panel during handling operations prior to the heat-treating operation. Adhesives of the invention that exhibit at least about 35 grams per centimeter width of adhesion are useful for such purposes. A desired minimal room-temperature pressure-sensitive adhesion can be achieved by empirically choosing an appropriate amount of tackifying resin for a particular acrylate polymer.

Other materials may also be added to an adhesive composition of the invention to achieve particular effects. Phenolic resins, for example, either novolac or resole resins made from phenol and formaldehyde, are added to the adhesive composition for additional control of preadhesion and for strengthening of the ultimate heat-activated adhesive bond, possibly as a result of crosslinking or hydrogen bonding between the base polymer and the phenolic resin. Other additives that may be included in the composition are ultraviolet stabilizers, antioxidants, colorants, and reinforcing or extending fibers or particles. These materials may be added in amounts of less than one percent up to 50 percent or more.

Adhesive compositions of the invention are especially useful as an adhesive layer on reflective sheeting. However, they may be used as an adhesive layer on various other sheet materials and articles, and they may also be used as an adhesive material coated onto adherends at the time of a bonding operation. For example, they may be used as a trim adhesive, construction adhesive, pavement-marking adhesive, photo-mount adhesive, etc. Adhesives of the invention have been found to offer long "open" times, i.e., times after the adhesive has been heated to a state of activation during which the adhesive will continue to form a good bond, which are advantageous in several of the listed uses.

The invention will be further illustrated by the following examples.

EXAMPLES 1 AND 2

Forty parts of a glycerol ester of a dark hydrocarbon-insoluble pine wood resin ("Vinsol Ester Gum" supplied by Hercules) were mixed with 40 parts of methyl ethyl ketone on a mechanical paint shaker until dissolved. The resulting solution was mixed for one hour on a three-blade propeller mixer with 220 parts of a 27-weight-percent-solids solution in ethyl acetate and toluene of an acrylate polymer made from 57.5 percent isooctyl acrylate, 35 percent methyl acrylate and 7.5 percent acrylic acid. The mixture was then coated onto a release liner and dried at 150° F. (65° C.), leaving dry adhesive coating having weights of about 9.0 grains per 4-inch-by-6-inch section (38 grams per square meter).

A similar adhesive was prepared in Example 2, except that 20 parts of the glycerol ester of pine wood resin, 20 parts of methyl ethyl ketone, and 300 parts of the acrylate polymer solution were used to prepare the adhesive mixture.

Preadhesion characteristics were measured by laminating the exposed surfaces of the coatings to a 25-micrometer-thick polyethylene terephthalate film; removing the release liner; pressing the films, exposed adhesive side down, onto a polycarbonate substrate with a 4.5-pound (2-kilogram) roller; and measuring the force required to peel the films from the polycarbonate surface at a rate of 20 inches (50 centimeters) per minute and at a 90° peeling angle. (This is also the test used herein to measure pressure-sensitive adhesion values of the acrylate polymer; the acrylate polymer of this example exhibits a pressure-sensitive adhesion in the stated test of about 230 grams/centimeter, when tested by itself without any tackifying resin present.)

Postadhesion characteristics, i.e., heat-activated adhesive characteristics, were measured by laminating the dry adhesive coating on the release liner to a 75-micrometer-thick aluminum foil; removing the release liner; pressing the exposed adhesive surface of the coatings onto a panel coated with Federal Yellow Baking Enamel No. 595A; heating the assembly 3 minutes at 180° F. (82° C.) under a vacuum; and measuring the force required to peel the films at a rate of 20 inches (50 centimeters) per minute and at a 90° angle from the enameled surface. Results are reported in Table I.

EXAMPLES 3-7

Example 1 was repeated except that a tackifying resin listed in Table II was used instead of the glycerol ester of pine wood resin used in Example 1. Results are reported in Table II.

EXAMPLES 8-10

Example 1 was repeated except that in all three examples, the acrylate polymer was replaced with the acrylate polymer listed in Table III; in Examples 8 and 9 the glycerol ester of pine wood resin was reduced to 15 parts, and 15 parts of a solid, low-reactivity phenolic resin (Super Beckacite 1003 supplied by Reichhold Chemicals Inc.) were used in addition; and in Example 10 the glycerol ester was replaced with 20 parts of Super Sta-Tac 80 (described in Table II). The pressure-sensitive adhesion of the acrylate polymer by itself, and the preadhesion and postadhesion characteristics of test films of the complete adhesive are listed in Table III.

EXAMPLES 11-14

Example 1 was repeated except that the amount of glycerol ester of pine wood resin was altered, and solid, low-reactivity phenolic resin (Super Beckacite 1003) was added in Examples 13 and 14, in amounts listed in Table IV. The shear strength of the test films was measured by bonding together two strips of aluminum overlapped at their ends in an area 0.5 inch by 0.5 inch (about 1.6 square centimeters) with the heat-activated adhesive films, and measuring the force required to be applied along the longitudinal axes of the aluminum strips to separate the aluminum panels. Results are reported in Table IV.

EXAMPLE 15

Example 1 was repeated except that the acrylate polymer constituted 72 parts of the dry adhesive coating, the glycerol ester 14 parts, and phenolic resin (Super Beckacite 1003) 14 parts. Preadhesion for the adhesive was measured as 53.6 grams/centimeter width and postadhesion was measured as 733 grams/centimeter.

TABLE I

| Example | Preadhesion (grams/centimeter) | Postadhesion (grams/centimeter) |
|---|---|---|
| 1 | 54 | 1984 |
| 2 | 125 | 1055 |

TABLE II

| Example | Parts of Acrylate Polymer | Tackifying Resin | Parts of Tackifying Resin | Preadhesion (grams/centimeter) | Postadhesion (grams/centimeter) |
|---|---|---|---|---|---|
| 3 | 60 | Dark amber natural gum rosin (Nelio N supplied by Union Camp) | 40 | 89 | 858 |
| 4 | 60 | Pale thermoplastic resin derived from the polymerization of mixed olefins (Super Sta-Tac 80 supplied by Reichhold Chemicals Inc.) | 40 | 39 | 661 |
| 5 | 60 | Synthetic polyterpene (Wingtack Plus supplied by Goodyear) | 40 | 89 | 876 |
| 6 | 60 | Medium soft thermoplastic coumarone-indene resin R 17 supplied by Neville) | 40 | 89 | 911 |
| 7 | 80 | Terpene-urethane resin (Iso-Terp 95 supplied by Schenectady Chemicals Inc.) | 20 | 72 | 1198 |

TABLE III

| | Acrylate Polymer | | Pressure-Sensitive Adhesion (grams/centimeter) | Preadhesion (grams/centimeter) | Postadhesion (grams/centimeter) |
|---|---|---|---|---|---|
| Ex. | Monomeric Ingredients | (percent) | | | |
| 8 | Isooctyl Acrylate | 70.0 | 535 | 89 | 643 |
| | Styrene | 25.0 | | | |
| | Acrylic Acid | 5.0 | | | |
| 9 | Isooctyl Acrylate | 40.0 | 1070 | 268 | 947 |
| | Ethyl Acrylate | 50.0 | | | |
| | Acrylic Acid | 10.0 | | | |
| 10 | 2-Methyl Butyl Acrylate | 90.0 | 160 | 89 | 785 |
| | Acrylic Acid | 10.0 | | | |

TABLE IV

| Example | Acrylate Polymer (percent) | Glycerol Ester (percent) | Phenolic (percent) | Shear Strength (kg./sq. centimeter) |
|---|---|---|---|---|
| Comparative Ex. A. | 100 | 0 | 0 | 22.0 |
| 11 | 75 | 25 | 0 | 40.6 |
| 12 | 65 | 35 | 0 | 45.3 |
| 13 | 75 | 12.5 | 12.5 | 32.7 |
| 14 | 65 | 17.5 | 17.5 | 31.8 |

What is claimed is:

1. Heat-activated adhesive comprising (a) an acrylate

3. Adhesive of claim 1 or 2 in which the tackifying resin comprises naturally occurring rosin or modified forms of such rosin.

4. Adhesive of claim 1 which further includes phenolic resin.

5. Heat-activated adhesive comprising (a) an acrylate polymer capable of room-temperature pressure-sensitive adhesion of at least 200 grams per centimeter width; and (b) room-temperature-solid tackifying resin that provides increased room-temperature tackiness when added in at least some amounts to said acrylate resin or natural rubber, but which is included in said heat-activated adhesive in an amount sufficient to reduce room-temperature pressure-sensitive preadhesion of the adhesive to a value between 35 and 350 grams/centime-